(12) United States Patent
Pettersson et al.

(10) Patent No.: US 6,667,695 B2
(45) Date of Patent: Dec. 23, 2003

(54) POSITION CODE

(75) Inventors: Mats Petter Pettersson, Lund (SE); Andreas Björklund, Lund (SE)

(73) Assignee: Anoto AB, Lund (SE)

(*) Notice: Subject to any disclaimer, the term of this patent is extended or adjusted under 35 U.S.C. 154(b) by 0 days.

(21) Appl. No.: 10/178,573

(22) Filed: Jun. 25, 2002

(65) Prior Publication Data

US 2003/0085884 A1 May 8, 2003

Related U.S. Application Data

(60) Provisional application No. 60/302,363, filed on Jul. 3, 2001.

(30) Foreign Application Priority Data

Jun. 25, 2001 (SE) .............................................. 0102235

(51) Int. Cl.[7] .......................... H03M 1/22; H03M 5/16; G06K 11/08; G08C 21/00
(52) U.S. Cl. ............................ 341/5; 341/57; 178/18.09
(58) Field of Search .......................... 341/50, 57, 63, 341/5, 13; 178/18.09, 18.01, 18.03; 235/375; 345/179; 382/306; 700/85; 708/131

(56) References Cited

U.S. PATENT DOCUMENTS

| | | | | |
|---|---|---|---|---|
| 4,506,252 A | * | 3/1985 | Jacoby et al. ................. | 341/57 |
| 5,023,434 A | * | 6/1991 | Lanfer et al. ................. | 235/375 |
| 5,477,012 A | | 12/1995 | Sekendur ..................... | 178/18.09 |
| 5,661,506 A | | 8/1997 | Lazzouni et al. ............ | 345/179 |
| 5,675,129 A | | 10/1997 | Burns et al. ................. | 178/18.01 |
| 5,937,110 A | | 8/1999 | Petrie et al. .................. | 382/306 |
| 6,208,771 B1 | | 3/2001 | Jared et al. ................... | 382/306 |
| 6,570,104 B1 | * | 5/2003 | Ericson et al. ............. | 178/18.09 |

FOREIGN PATENT DOCUMENTS

| | | |
|---|---|---|
| EP | 0984 390 A2 | 3/2000 |
| WO | WO 92/17859 | 10/1992 |
| WO | WO 99/23604 | 5/1999 |
| WO | WO 01/26032 A1 | 4/2001 |
| WO | WO 01/26033 A1 | 4/2001 |
| WO | WO 01/26034 A1 | 4/2001 |
| WO | WO 01/75783 A1 | 10/2001 |

* cited by examiner

*Primary Examiner*—Patrick Wamsley
(74) *Attorney, Agent, or Firm*—Birch, Stewart, Kolasch & Birch, LLP.

(57) ABSTRACT

In a method for position coding, positions are coded in a first dimension on a surface in accordance with a primary number sequence that has the property that the place in the primary number sequence of each partial sequence of a first predetermined length is unambiguously determined. Each position in the first dimension is coded by one of the partial sequences. The primary number sequence is built up of at least two secondary number sequences that have a smaller base than the base of the primary number sequence and that are used for determination of the partial sequences of the primary number sequence which correspond to the positions in the first dimension. This makes possible, among other things, realization of the method in devices with limited memory capacity, as the secondary number sequences require less memory in total than the primary number sequence. The secondary number sequences can also be used for decoding the position code.

48 Claims, 5 Drawing Sheets

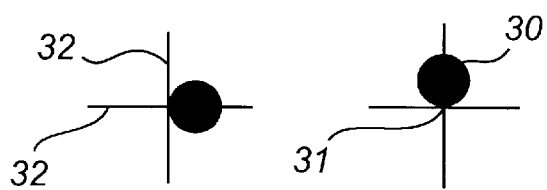
Fig. 3a  Fig. 3b
Fig. 3c  Fig. 3d
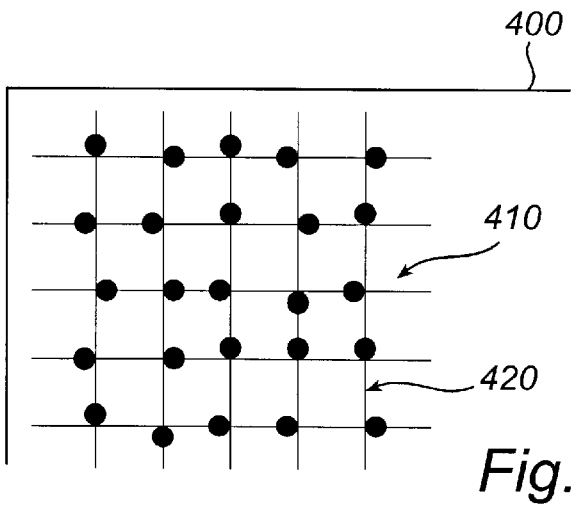
Fig. 4
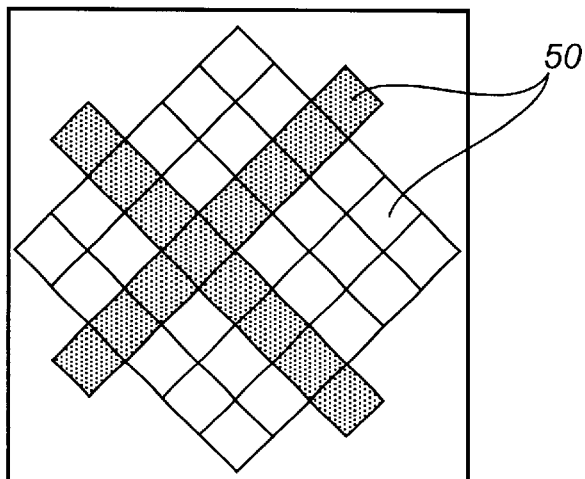
Fig. 5

POSITION CODE

This application claims the benefit of Provisional Application No. 60/302,363, filed Jul. 3, 2001.

FIELD OF THE INVENTION

The present invention relates to methods for achieving a position code, a method for decoding of a position code, a computer program for these purposes, a product that is provided with a position code and devices for position coding and for decoding of a position code.

BACKGROUND ART

The use of position codes on a surface as a tool for recording in electronic form information that is written or drawn on the surface is already known.

In U.S. Pat. No. 5,477,012 a pen is described that detects optically a position code consisting of various symbols on a surface. The pen decodes the position code and gene-rates pairs of coordinates that describe the movement of the pen across the surface. Each position is coded by a specific symbol. If the position code is to code many positions, this results in the disadvantage that the symbols become complex and hence difficult to detect correctly. On the other hand, if the symbols are made larger, the resolution is decreased.

In WO 92/17859 a position code is described in which each position is coded by means of a plurality of symbols and each symbol contributes to the coding of more than one position. Adjacent positions are thus coded by partially shared symbols.

In Appendix A of WO 92/17859 the following example is given of how the position code can be built up and how a position can be decoded.

Start from the following m-sequences: s=(0,0,1,0,1,1,1) and t=(0,1,1). Build up a position-coding pattern by letting a first column in the pattern be the same as the sequence s. In order to build up the following columns, look at the t-sequence. If the first element in the t-sequence is 0, then the second column consists of the s-sequence. If the first element is 1 instead, then the second column consists of the s-sequence with a circular shift of one step. Subsequent columns are built up in a corresponding way in accordance with the values of the elements in the t-sequence. The following pattern is thus obtained:

| 0 | 0 | 1 | 1 |
|---|---|---|---|
| 0 | 0 | 0 | 1 |
| 1 | 1 | 0 | 0 |
| 0 | 0 | 1 | 0 |
| 1 | 1 | 0 | 1 |
| 1 | 1 | 1 | 0 |
| 1 | 1 | 1 | 1 |

Now assume that we want to find the position of a partial surface with the following subset of the pattern.

| 1 | 0 | 0 |
|---|---|---|
| 0 | 1 | 0 |
| 1 | 0 | 1 |

The first column in the subset is (1,0,1). This subsequence appears in position 2 in the s-sequence. The circular shifts in the subset are (1,1). This sub-sequence appears in position 1 in the t-sequence. The accumulated shifts in the pattern are (0,0,1,2) and therefore the vertical position of the subset is 2+0=2. The position of the subset on the partial surface is thus (1,2).

This pattern has the advantage that it can be coded on a base using simple symbols, for example a first symbol for a zero and a second symbol for a one.

An interesting property of a position-coding pattern of this type is, however, the ability to code a large pattern with many unique positions so that position determination can be carried out on as large a surface as possible. In the example above, the size in the vertical direction is limited by the length of the s-sequence and the size in the horizontal direction by the length of the t-sequence. The length of these sequences cannot be increased without limit as the sequences must have the property that if a sub-sequence is taken of k bits, then this sub-sequence must only occur in one single place in the sequence. An increase in the length of the sequence can thus bring about an increase in the length of the sub-sequence and thereby an increase in the partial surface that needs to be recorded in order to be able to determine a position.

In WO 01/26032, WO 01/26033 and WO 01/26034, which have been assigned to the Applicant of the present application, another position-coding pattern is described that is based on the same basic principles as those in WO 92/17859, but which enables coding of a larger number of positions.

In one embodiment of this pattern, a first number sequence is used that has the property that the place in the number sequence of each sub-sequence or partial sequence of a predetermined length is unambiguously determined and this number sequence is printed out in columns over the surface with various rotations or circular shifts. Instead of using a binary second sequence (the t-sequence in WO 92/17859), however, larger circular shifts between adjacent columns are permitted.

The surface is further divided into code windows. Each code window comprises at least three columns with number sequences and overlaps the adjacent code windows by one number sequence. Using the shifts between adjacent columns, the position of the code window along the x-axis is coded. The shifts between the number sequences in a code window thus define a position, the first code window having the position 0, the next 1, and so on.

When reading off the position code, the reading device will often, however, record parts of two code windows. In order that the position of the code windows relative to the read-off image of the position code can be determined, shifts in a first range are used to indicate the least significant shift for the position and shifts in a second range for other shifts in the position.

The coding of a y-coordinate is carried out in a corresponding way.

This position code has been found to work very well and permits coding of a very large number of positions. There is, however, a desire to improve the error-correction properties of the position code.

Assume, for example, that the least subset that unambiguously codes a position in the x-direction comprises five shifts. From these five shifts, a position of a code window can be determined. The positions of two adjacent code windows thus usually only differ in the last digit (the last shift). For three consecutive code windows the shifts can, for example, be as follows:

25,15,34,18,3; 25,15,34,18,4; 25,15,34,18,5;

A common method of detecting errors is based on reading off more information than what is needed for the task concerned. With the above-mentioned coding, it is difficult to read off extra information which is suitable for use for error detection. Assume, for example, that a reading device records the two last shifts from the first of the above three code windows, and the first three shifts from the following code window, that is 18,3,25,15,34. Assume further that an error occurs that means that 18,4,25,15,34 is recorded. The reading off of, for example, two more shifts, one on each side of the five, provides no extra information that makes it possible to detect the error.

If, when coding in the x-direction, a number sequence is used with the property that each partial sequence (sub-sequence) of a predetermined length has an unambiguously determined place in the number sequence, error correction is facilitated. On the other hand, the practical problem arises that this number sequence must have a large base, that is must permit large shifts, if it is to be possible to code many positions. A very large table is then required in order to find the place in the number sequence to which a read-off partial sequence corresponds, which in turn requires a large amount of memory. It is, however, desirable for the decoding to be able to be carried out in, for example, a hand-held reading device with limited memory and processor capacity. It is also desirable that the coding should be able to be carried out in devices with limited memory and processor capacity.

SUMMARY OF THE INVENTION

An object of the present invention is therefore to reduce the above-mentioned problems by providing a position code that makes it possible to code a very large number of positions, that permits error correction, but yet does not require the storage of large tables for the coding and decoding and which therefore can be realized in devices with a limited amount of memory and/or limited processor capacity.

Another object is to make possible effective and correct decoding of a position code that codes a very large number of positions.

These objects are achieved completely or partially by a method for position coding according to claim 1, a computer program according to claim 19, a method in a coding device according to claim 20, a computer program according to claim 32, a method for decoding a position code according to claim 33, a computer program according to claim 41, a product according to claim 42 and devices according to claims 43–45.

A first aspect of the invention thus relates to a method for position coding, comprising coding positions in a first dimension on a surface in accordance with a primary number sequence, which has the property that the place in the primary number sequence of each partial sequence of a first predetermined length is unambiguously determined, each position in the first dimension being coded by any one of the partial sequences, the primary number sequence being built up of at least two secondary number sequences that have a smaller base than the base of the primary number sequence and that are used for determination of the partial sequences of the primary number sequence corresponding to the positions in the first dimension.

As the primary number sequence is built up of secondary number sequences with a smaller base, preferably at most the base 5, the table that is required to convert places in the primary number sequence into partial sequences of this can be replaced by several smaller tables that together require less memory. Thus it becomes in practice feasible to code coordinates for a very large number of positions.

The use of a primary number sequence for coding positions in at least a first dimension also makes it possible to achieve a position code with very good error-detection and error-correction properties. More specifically, each number in the primary number sequence is coded using partial sequences of a cyclic main number sequence. If partial sequences of the main number sequence are now recorded that are longer than what is required for position determination, error detection and error correction can be achieved by the main number sequence being designed in such a way that the longer partial sequences do not occur in certain incorrect versions, for example with one incorrect figure.

Also for the decoding, the fact is used that the primary number sequence is built up of secondary number sequences with smaller bases, the decoding being able to be carried out using several smaller tables and using the Chinese remainder theorem. The decoding can thereby be realized in, for example, a hand-held device with limited memory and processor capacity.

The position coding can be utilized for coding positions in both one and two dimensions. The coding in the second dimension can be carried out using the same principles and with different number sequences to those utilized for the coding in the first dimension or with the same number sequences.

BRIEF DESCRIPTION OF THE DRAWINGS

The present invention will now be described using an exemplary embodiment and with reference to the accompanying drawings, in which FIGS. 3A, 3B, 3C, and 3D show examples of graphical coding of the position code, FIG. 4 shows a product with an enlarged position code, FIG. 5 shows how extra symbols can be recorded for error-correction purposes.

DESCRIPTION OF EMBODIMENTS

Figures 1, 2:
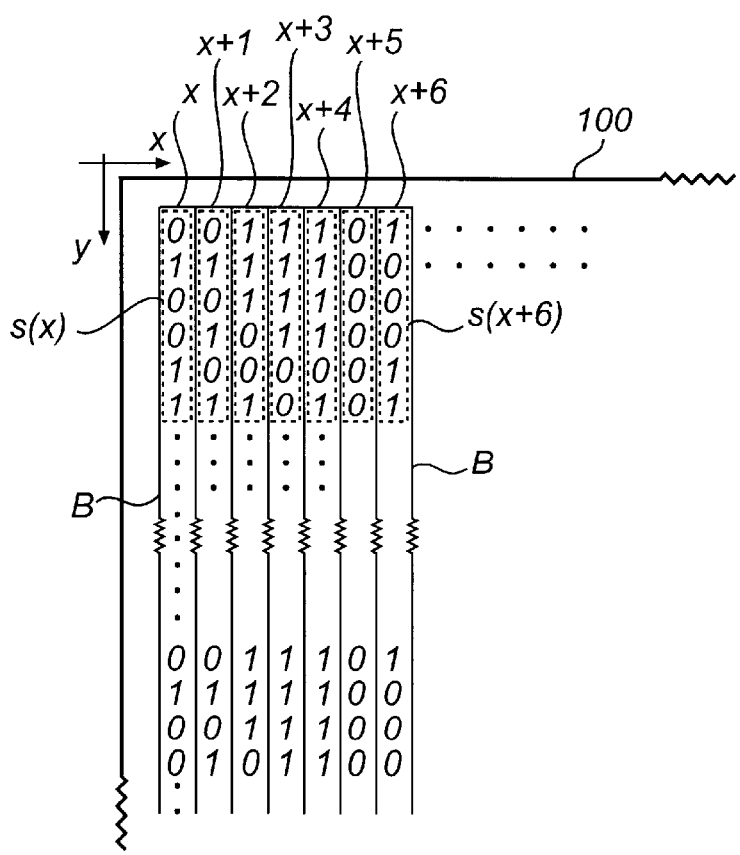
FIG. 1 shows schematically how the coding in the x-direction of positions in a first direction is carried out.
FIG. 2 shows schematically how a primary number sequence PD is built up of four secondary number sequences A1–A4.

In the following, the general principles for position coding according to the invention will be described using a specific example. Thereafter, it is described how the coding and decoding can be implemented in practice. Thereafter, an example is described of a reading device that can be used for decoding of the position code. Finally, alternative embodiments are described.

General Principles for the Position Coding

The position code is used to code positions in one or more dimensions. In order to simplify the description, the position coding is first considered in a first dimension, which in this example is in the x-direction. A cyclic main number sequence is used for the coding in this direction, which cyclic main number sequence has the property that the place in the cyclic main number sequence of each partial sequence of a predetermined length is unambiguously determined. In this example, the predetermined length is 6. Thus if six consecutive numbers are taken from any place in the cyclic main number sequence, then these six numbers will only occur once in the main number sequence in this order. The property also applies if the end of the main number sequence is connected to the beginning of the main number sequence. The main number sequence is therefore called cyclic. In this example, a binary main number sequence is used. If the place of a partial sequence with six numbers is to be unambiguously determined, the main number sequence can thus have a maximal length of $2^6=64$ and the partial sequences of length 6 can have the places 0–63 in the main number sequence. If, however, a main number sequence of length 63 is selected, improved error-correction properties are obtained, as will be described below. In the following, it is thus assumed that the length of the main number sequence is 63 and that it thus defines unique places in the range 0–62. With this length of the main number sequence it is in practice feasible to have a table that converts each partial sequence into a place in the main number sequence and vice versa.

Assume that the commencement of the main number sequence is as follows:

0,0,0,0,0,0,1,0,0,1,1,1,1,1,0,1,0 . . .

The partial sequence 0,0,0,0,0,0 has then, for example, the unambiguous place 0, the partial sequence 1,1,1,1,1,0 has the unambiguous place 9 and the partial sequence 1,1,1,0,1,0 has the unambiguous place 11 in the main number sequence.

The position coding is based on utilizing different rotations or circular shifts of the cyclic main number sequence. In order to code positions in the x-direction, the main number sequence is printed out or arranged in some other way, rotated or circularly shifted in various ways, in columns across the surface, that is in the y-direction orthogonal to the direction in which positions are to be coded. The main number sequence can be printed out repeatedly in the same column, which is required if more positions are to be coded in the y-direction than what corresponds to the length of the main number sequence. The same rotation of the main number sequence is then used for all the repetitions. However, different rotations can be used in different columns.

FIG. 1 shows schematically a sheet of paper 1 with seven columns x–x+6. Only the first numbers in the different rotations of the main number sequences are printed out. A whole main number sequence is marked schematically by a box B. In addition, in FIG. 1 the first partial sequence S of six numbers is marked in each column by a box drawn with broken lines. As mentioned above, each of the partial sequences S has an unambiguously determined place in the main number sequence.

Each pair of adjacent columns defines a difference number d. The difference number d is given by the difference between the places in the main number sequence of the first partial sequence in the respective columns. If instead the difference is taken between the places of the partial sequences one step down in the columns, the result will be the same since the places are displaced in the same way. The difference number d will thus be the same, irrespective of at what "height" in the columns the places of the partial sequences in the main number sequence are compared. For each pair of columns the difference number d is thus constant in the y-direction.

The first partial sequence of the main number sequence in the column x+5 is 0,0,0,0,0,0, which corresponds to place 0 in the main number sequence. The first partial sequence of the main number sequence in column x+6 is 1,0,0,0,1,1, which corresponds to place 57 in the main number sequence. The difference or the circular shift between these columns is thus 57, so d(x+5)=57. It should be pointed out that the difference numbers are determined modulo the length of the main number sequence.

The difference numbers that can be coded in this way are in the range 0-K-1, where K is the length of the main number sequence which in this case is K=63 and with which it is thus possible to code difference numbers in the range 0–62. By selecting different rotations of the main number sequence, it is possible to create a sequence of difference numbers, in the following called a primary number sequence or primary difference number sequence, which has the property that each partial sequence of a predetermined length has an unambiguously determined place in the primary number sequence. In this example, the predetermined length is 5. As each partial sequence consisting of five difference numbers has an unambiguously determined place in the primary difference number sequence, this can be used to code positions in the x-direction. In FIG. 1, the partial sequences S(x)–S(x+5) will thus code five difference numbers d(x)–d(x+4) which give a partial sequence of the primary number sequence.

It should also be pointed out that in practice the partial sequences are not normally printed out with their explicit values but with a graphical coding.

The columns of the main number sequence's binary numbers form a matrix, which in the following will be called the x-matrix.

If the length of the main number sequence is K, the base in the primary difference number sequence will equal K and its maximal length will be $K^5$, that is in this case $63^5$. It is, however, not in practice feasible to use a table to convert partial sequences into places in the primary difference number sequence and vice versa for a base that is so large. If, however, the base is reduced in order to be able to use manageable tables, the number of positions that can be coded will be reduced.

This problem is solved by building up the primary difference number sequence of shorter difference number sequences, which in the following are called secondary difference number sequences or secondary number sequences, and by using the secondary difference number sequences, for which the partial sequences and their places can be arranged in smaller tables, when coding and decoding the position code, in order to determine the partial sequence in the primary difference number sequence that corresponds to a particular x-coordinate and vice versa.

The secondary difference number sequences can be determined as follows:

Firstly, difference numbers are allowed only in a range that is such that the number of different difference numbers can be factored into at least two factors. In the example with a main number sequence of length 63, difference numbers are allowed only within a range of length 54. The number 54 can, in fact, be factored as 2*3*3*3. Alternatively, 60 difference numbers, that is 5*3*2*2 difference numbers, could be selected but in order for the tables to be as small as possible it may be expedient to select numbers that give as small factors as possible.

Secondly, the same number of secondary difference number sequences are formed as the number of factors that the number of different difference numbers can be factored into. In this example, the number of secondary difference number sequences is thus equal to four.

In addition, we let each factor form a base in its respective secondary difference number sequence. In this example, we thus obtain one secondary difference number sequence with the base two and three secondary difference number sequences with the base three.

The maximal length of the secondary difference number sequences is thus 32 and 243 respectively if the secondary difference number sequences are also to have the property that a partial sequence of length five is to have a unique place in the secondary difference number sequence. With such lengths of the secondary difference number sequences, it is in practice feasible to convert partial sequences into places and vice versa. If instead we had chosen to use 60 difference numbers, we would have had a secondary difference number sequence with the base 5 and thus a maximal length of 3125, which gives a table that takes considerably more memory, but is, however, still manageable.

Finally, the length of the secondary difference number sequences is selected so that the lengths are relatively prime in pairs. This means that for each pair of secondary difference number sequences the length of one difference number sequence is not to have any factor in common with the length of the second difference number sequence. This means in addition that if each of the difference number sequences is repeated, then the same combination of a partial sequence from each secondary difference number sequence will not arise until after $L=l_1*l_2* \ldots *l_m$ places, where $l_1$ is the length of the secondary difference number sequence 1, $l_2$ is the length of the secondary difference number sequence 2, and so on up to $l_m$ which is the length of the last secondary difference number sequence. If there are only two secondary number sequences, of course, $L=l_1*l_2$ This is illustrated schematically in FIG. 2. At the top is shown the primary number sequence PD which runs in one long sequence with difference numbers that are here only indicated by X. Underneath are shown schematically the secondary number sequences A1–A4. Vertical lines show where the number sequences recommence. A partial sequence of the primary number sequence and corresponding partial sequences of the secondary number sequences are indicated by broken lines. It can be seen that the partial sequences correspond to different places in the secondary number sequences.

The representation of partial sequences of the primary difference number sequence by combinations of partial sequences of the secondary difference number sequences is, in this example, bijective. This is not, however, necessary.

The position coding in a second dimension, for example in the y-direction in this case, can be carried out in accordance with the same principle as the position coding in the first dimension. The main number sequence is then arranged with different circular shifts in rows on the surface, that is in the x-direction in FIG. 1. Difference numbers are defined between adjacent rows and these difference numbers form a primary difference number sequence, that can be built up of secondary difference number sequences. It is possible to use another main number sequence, another primary difference number sequence and other secondary difference number sequences in the second dimension. The bases in the various number sequences can also be other than those that are used for the coding in the first dimension. In this example, however, the same sequences are used in both the x-direction and the y-direction. In a corresponding way to the coding in the x-direction, the coding in the y-direction results in a matrix in which the values of the rows consist of the binary values of the main number sequence.

If the x- and y-matrices are superimposed, for each point in the resulting xy-matrix there will be one bit from the x-matrix and one bit from the y-matrix. At each point the following four bit combinations can thus be obtained: 0,0; 0,1; 1,0; and 1,1. These different combinations can be coded graphically on a surface, for example in the way shown in FIGS. 3a–d in which a dot 30 is displaced in any one of four directions from a nominal point 31 in a raster, in which each nominal point corresponds to the intersection between lines 32 in the raster. This type of graphical coding is described in greater detail in WO 01/26032, in which the actual underlying position coding is, however, carried out in a different way. The coding that is used in this example is as follows:

| Value | Displacement | Pair of bits |
| --- | --- | --- |
| 1 | right | 0, 1 |
| 2 | upwards | 0, 0 |
| 3 | left | 1, 0 |
| 4 | downwards | 1, 1 |

The raster can be virtual, in which case it is thus not printed out explicitly on the surface with the position code.

FIG. 4 shows schematically a part of a product in the form of a sheet of paper 400 with position code 410. It should be emphasized that the position code in FIG. 4 is greatly enlarged in relation to a version that is suitable for digitizing handwriting, for example. In addition, the raster 420 is marked in FIG. 4. Normally, however, this not printed out.

Of course, other types of graphical coding can be selected the four pairs of bits, such as four dots of difference sizes, four marks with different shapes or four marks with different rotation.

As the position coding is based on differences between places of different partial sequences in the main number sequence and the same differences can be obtained using different pairs of partial sequences, the primary difference number sequence can be achieved in various ways. More specifically, 63 different "versions" of the primary difference number sequence can be achieved, depending upon which partial sequence, that is which rotation of the main number sequence, is selected to start the very first column (x=0) in the x-matrix and the very first row (y=0) in the y-matrix. It is thus possible to generate K*K (in this example 63*63= 3969) different "versions" of the position code that utilize the same primary difference number sequence for the coding in the x-direction and the y-direction. These different versions of the position code are called sections in the following. The section number xs for the position code in the x-direction and the section number ys for the position code in the y-direction can be designated as an additional coordinate for the x-direction and y-direction respectively.

In the example above, only a subset is used of the difference numbers that theoretically can be coded using the main number sequence, more specifically only 54 of 63 possible difference numbers. The partial range of the theoretically possible difference numbers can be selected in various ways. In this example, difference numbers close to zero (modulo the length of the main number sequence) can create unwanted regularities in the position code. Therefore in this example difference numbers are selected in the range (5,58). This must be taken into account in connection with the conversion between the partial sequence in the primary number sequence and the partial sequences in the secondary number sequences, which will be described in the following.

Now assume that the position code is arranged on a surface. A reading device can have an area sensor that detects a subset of the position code corresponding to at least 6*6 dots. When reading off, the reading device can be held rotated in various ways in relation to the position code. An image of the position code does not in itself reveal the rotation between the position code and the reading device, as the position code in principle looks the same whether it is rotated through 0, 90, 180 or 270 degrees. When the position code is rotated, the direction of the displacement of each dot is, however, changed, which in turn leads to the pair of bits that is coded by the displacement of the dot being changed. How the change occurs depends on the conversion between displacement and pair of bits. Below it is assumed that the conversion is carried out as described above. There are three different cases:

1) With 180 degrees rotation of the image of the position code, the cyclic main sequence that codes x- and y-positions in the non-rotated position code will be read backwards when an attempt is made to decode the position on the basis of the image. With the combination of displacements and pairs of bits described above, the bits that are decoded will be inverted since the position code is read upside down.
2) With 90 degrees rotation in a clockwise direction, a bit sequence that codes the x-position in the non-rotated matrix will be read backwards when an attempt is made to decode the y-position in the rotated matrix and the bits will be inverted.
3) With 270 degrees rotation in a clockwise direction, a bit sequence that codes the y-position in the non-rotated matrix will be read backwards when an attempt is made to decode the x-position in the rotated matrix and the bits will be inverted.

This means that if the partial sequences in the right-way-up, non-rotated matrix never occur inverted and backwards in the cyclic main number sequence, then 90, 180 and 270 degrees rotation can be detected. If such a condition is to be fulfilled for the main number sequence this means that its length is reduced considerably, which in turn means that fewer positions can be coded.

In order to solve this problem, we instead let the condition be fulfilled for longer partial sequences of the cyclic main number sequence. This means that longer partial sequences than what is required for the actual position determination must be read off. In certain cases, such longer partial sequences are already available during the reading off. If the least subset of the position code that codes the coordinates for a position is quadratic, as is the case in this example, a part of the position code must always be read off that is so large that it also includes the whole of the least subset even when the reading device is rotated through 45 degrees in relation to the position code. Therefore, at least one partial sequence that is longer than what is required for the position determination is always included. This is illustrated in FIG. 5, where each square 50 corresponds to a dot and the gray-shaded squares illustrate that it is always possible to read off at least one row and one column with two extra dots.

In the current example where the partial sequences of the main number sequence for position determination have the length 6, partial sequences of length 8 can be used for the detection of the rotation. These eight bit long partial sequences must thus have the property that they do not occur backwards and inverted in the main number sequence. This property cannot be achieved for a 64 bit long main number sequence, which is the reason that the length is selected as 63 instead.

In two of the above-mentioned rotations, viz. 90 and 270 degrees, one sequence turned the right way round and one sequence turned the wrong way round will be read off. With the above-described method for rotation detection, a rotation error will be detected in only a first of the two reading-off directions (x and y). In the second reading-off direction the circular shifts that code the position in the first reading-off direction of the correctly rotated image will be seen.

In the case of the 90 degree rotation in a clockwise direction, the circular shifts that code the y-coordinate of the correctly rotated image will be seen when decoding in the x-direction. It is thus the partial sequence of the primary difference number sequence of the y-direction which is seen, but turned the wrong way round (running from the right to the left instead of from the left to the right, which would be the case of the partial sequence of the primary difference number sequence of the x-direction).

In the corresponding way, the partial sequence of the primary difference number sequence of the x-direction will be seen turned the wrong way round, when decoding in the y-direction in the case of the 270 degree rotation.

The reason why the partial sequences appear turned the wrong way round, is the relative orientation of the primary difference number sequences of the x- and y-directions. Starting from the edge of the total position coding pattern, the primary difference number sequence of the x-direction is running in the clockwise direction, while the primary difference number sequence of the y-direction is running in the counterclockwise direction. If they had been running in the same direction, they would not have been turned the wrong way round, but the right way round in the above-described cases.

There are a number of advantages of letting the primary difference number sequences run in opposite directions. In those cases where the partial sequence of the primary difference number sequence is seen turned the right way round, the "correct" coordinate will be decoded, but in the wrong direction. This coordinate will not only correspond with the six circular shifts from the primary difference number sequence required for the decoding, but surrounding shifts will confirm that the decoded coordinate is correct. In the case where the primary difference number sequences are running in opposite directions, six circular shifts from a primary difference number sequence are also decoded, but in the wrong order, resulting in a coordinate which statistically will not correspond with surrounding parts of the wrongly turned primary difference number sequence. This fact results in better possibilities for error detection.

Another advantage is that the risk of successive errors, i.e. errors where a plurality of successive images are decoded to adjacent positions, is less if the primary difference number sequences are running in opposite directions. More particularly, different adjacent sets of six circular shifts in a primary difference number sequence turned in the wrong way tend not to code adjacent coordinates. Successive errors are more difficult to detect than other errors where the spread of the incorrect coordinates is large.

The same basic principles as are used for the detection of rotation can be used for error correction. The main number sequence can, for example, be selected in such a way that partial sequences of some predetermined length that is longer than what is required for position determination do not occur with a bit inverted in the main number sequence. If all the bits except one in such a longer partial sequence can be detected with certainty, then the incorrect bit can be corrected.

Such error-detection and error-correction properties of the position code can be improved considerably by an intelligent choice of the main number sequence. Further improvement can be achieved by the selection of the secondary difference number sequences.

In the example above, the main number sequence and the secondary difference number sequences have been selected in the way shown in Appendix A.

The secondary difference number sequences have the following special error-correction properties:

Assume that precisely one of the partial sequences of the main number sequence is decoded incorrectly, which leads to an incorrect place in the main number sequence being decoded. As each place is used to calculate two adjacent difference numbers, these will both be affected by the incorrect decoding. If any one of the difference numbers is outside the difference number range used (5,58), the error will be detected immediately. If this is not the case, however, at least one partial sequence in the combination of partial sequences of the four secondary difference number sequences in which the partial sequence of the primary difference number sequence results will be distorted in two adjacent positions. As the two first secondary difference number sequences A1 and A2 both have the base 3 and the number of unused difference numbers is 9=3*3, a distortion in any one of these two sequences has the property that the sum of the two affected numbers always has the same value modulo 3. The two secondary number sequences A1 and A2 have the property that for each partial sequence of length 7 at most one of 14 possible distortions of the partial sequence that are caused by a single incorrect place decoding will be found in the secondary number sequence. The third secondary number sequence A3 has in addition the property that for each partial sequence of length 7 at most one of 13 possible distortions of the partial sequence that are caused by a single incorrect place decoding will be found in the secondary number sequence. The fourth secondary number sequence A4 has the same property for at most seven of 28 possible distortions. The probability of a single incorrect decoding of a partial sequence of the main number sequence being detected is thus great.

With the selected sequences, a total of 410815348 different positions can be coded in each dimension of a section. The number of different sections that can be coded is as mentioned $63^2$. The total number of positions that can be coded is thus $63^2*410815348^2=6.7*10^{20}$ positions.

If each position corresponds to a surface of $0.3*0.3$ mm$^2$, this corresponds to unique positions being able to be coded on a surface of 60 million km$^2$. This surface that is made up by all the unique points that theoretically can be coded by means of the position code can be called an imaginary surface. The coordinates that the position code codes are thus absolute coordinates for points on the imaginary surface. Parts of the position code can be applied on a physical base or surface. The position code then codes positions on this base. However, the coordinates do not normally relate to absolute coordinates for the positions on the physical base but for the points on the imaginary surface.

Practical Example of Position Coding

In the following, it will be described how the position coding can be realized in practice. Normally a user is not interested in printing the whole position code from coordinate 0 and upwards, but rather the user has been allocated a specific coordinate area that can be used for a specific application. A practical problem is then how the position code is to be determined for this specific coordinate area.

The position code can be determined or generated in a coding device that can consist of a processor unit of some suitable type. The processor unit then comprises the actual processor, working memory and program memory, in which is stored a computer program with instructions for determining the position code. The processor unit can be incorporated in a typical personal computer, in a printer or in some other suitable device. The coding device can alternatively consist of special-purpose hardware, such as an ASIC (Application-Specific Integrated Circuit) or an FPGA (Field Programmable Gate Array) or a similar unit that can be adapted so that it is suitable for this specific task, or of digital and/or analogue circuits or of some suitable combination thereof.

The smallest part of the position code that it is meaningful to generate is the part that codes the coordinates for a single point. In this example, this corresponds to generating a matrix with 6*6 displacement values that describe the displacement of 6*6 dots from their respective raster points in a regular raster.

Often, however, the generation of a subset of the position code that codes coordinates for a plurality of points, that is a larger matrix, is required.

The input signal to the coding device can in the general case comprise six parameters:

x: which is the x-coordinate for the column furthest to the left in the position code.

y: which is the y-coordinate for the uppermost row.

xs: which indicates which section of the position code is used for the x-position code.

ys: which indicates which section of the position code is used for the y-position code.

Width: which indicates the number of columns in the position code, that is the size of the coordinate area in the x-direction.

Height: which indicates the number of rows in the position code, that is the size of the coordinate area in the y-direction.

These parameters are entered into the coding device by a user or from an external unit. Optionally, a pointer to a matrix that is to be filled with displacement values can also be included. Otherwise memory is allocated for the matrix.

The task of the coding device is to associate each point in the matrix with a displacement value o that indicates in which direction a dot is to be displaced in the position code that is printed on a base.

The displacement value o, which in this example can be 0–3, is determined, as has been described above, by the bits in a pair of bits, where the first bit constitutes the x-position code's value $m_x$ for the current point, while the second bit constitutes the y-position code's value $m_y$ for the current point. If the pair of bits is known, the displacement value can be looked up in a table O that converts pairs of bits into displacement value.

The value $m_x$ of the x-position code depends, of course, on the point at which we are situated, that is on x and y, but also on the current section of the position code. Thus $m_x=m_x(x,xs,y)$. In a corresponding way, the value m of the y-position code depends on the point at which we are situated, that is x and y, and on the current section of the y-position code. Thus $m_y=m_y(y,ys,x)$.

If we determine at what place s the cyclic main number sequence commences in column x in section xs and we add y (where the result is taken modulo the length of the main number sequence), then we obtain the place in the main number sequence at which we are situated at the point x,y for the x-coding. We can then look up in a table M of main number sequences which number (bit) in the main number sequence has this place and thus constitutes the value of the x-coding at the point x,y. This can be expressed as $m_x(x,y,xs)=M[(s(x,xs)+y) \pmod{63}]$.

By carrying out corresponding operations, the value of the y-coding can be found at the point x,y. In this way we have access to the pair of bits from which the displacement o which is to be stored at point x,y in the matrix is to be determined.

What the coding device needs to calculate is thus first in which place s the main number sequence commences for column x which is the column furthest to the left in the subset of the position code that codes the coordinates for the point x,y. In other words, it can be said that the circular shift is calculated for the main number sequence in column x.

This can be carried out as follows.

The difference number d(x) is defined, as previously indicated, by the places in the main number sequence of the first partial sequence in column x and the first partial sequence in the adjacent column x+1. More specifically, it is the case that:

$d(x)=(s(x+1,xs)-s(x,xs))$ (modulo the length of the main number sequence)

where s(x,xs) is thus the place in the main number sequence or the circular shift for the main number sequence in column x in section xs of the position code.

As a definition, it is furthermore the case that s(0,xs)=xs, that is the circular shift for the main number sequence in the very first column in the x-position code defines the x-section.

Based on this, s(x,xs) can thus be determined as $s(x,xs)=(xs+\text{sum}(j=0 \ldots x-1)d(j))$ (modulo the length of the main number sequence).

As it is not, in practice, possible to store the primary difference number sequence that defines values d(x) of the difference numbers for all x for position codes that code coordinates for many points, the fact is now utilized that each difference number in the primary difference number sequence is mappable on a combination of one number from each of the secondary difference number sequences. Here it is the case in general that:

$d(x)=dc(1,x)+b_1*dc(2,x)+ \ldots +b_1* \ldots *b_{n-1}*dc(n,x)$ where n is the number of secondary difference number sequences and where $b_i$ is the base in the difference number series i for i=1−n−1 and where dc(i,x) can be determined by being looked up in a table $DC_i$ with the numbers in the difference number sequence i, where thus $dc(i,x)=DC_i$ [x modulo the length of the difference number sequence i]. It should be pointed out that if there are only two secondary difference number sequences, then of course only the first two terms in the expression above are used.

In the case in question, we thus obtain $d(x)=5+dc(1,x)+3*dc(2,x)+9*dc(2,x)+18*dc(3,x)$ where the constant 5 originates from the fact that difference numbers in the range 5–58 are used.

As the contributions from the various secondary difference number sequences are independent, the sum can be calculated of all the difference numbers up to difference x separately for each secondary difference number sequence. In FIG. 2 it can be seen as if all the difference numbers up to the place x are summed separately for each sequence.

In practice, this sum can be easily determined by the use of constants and tables. Contributions from the whole cycles of the secondary difference number sequences are in fact constant and can thus be determined in advance and stored as constants. These constants are here designated $DCCS_i$. Contributions from incomplete cycles of the difference number sequences can also have been determined in advance and stored in tables, which for each place in the respective secondary difference number sequence give the sum of difference numbers up to and including this place. This table has here been designated $DCICS_i$. The contribution from the constant term 5 is 5*x.

The term $\text{sum}(j=0 \ldots x-1)d(j)$ can thus be determined for each secondary difference number sequence as $DCCS_i*(x \text{ div } l(i))+DCICS_i[x \bmod l(i))]$ where l(i) is the length of the secondary difference number sequence i.

When s(x,xs) has been determined, the value of the x-position code at the point x,y can thus be determined, as has been described above, by the use of the known value of y and by table look-up.

For the subsequent columns in the x-position code, s(x,xs) does not, of course, need to be determined as described above, but instead the fact is utilized that s(x,xs) is already known and s(x+1,xs) is calculated using the following relationships.

$d(x)=(s(x+1,xs)-s(x,xs))$ (modulo the length of the main number sequence)

$d(x)=5+dc(1,x)+b_1*dc(2,x)+ \ldots +b_1*b_2*b_{m-1}*dc(m,x)$ $dc(i,x)=DC_i$ [x modulo the length of the difference number sequence i].

This procedure is then repeated for the required number of columns in accordance with the input parameter "width".

s(y,ys) is determined in a corresponding way to s(x,xs) and, using the input parameter x, the value of the y-position code at the point x,y can also be determined.

When both these values have been obtained, the displacement at the point x,y can be determined by being looked up in the table O.

In order to code positions, the coding device can thus use the following tables and constants:

M: Numbers in the main number sequence at different places in the sequence

O: The displacement (0–3) for different pairs of bits $DC_i$: Numbers in the secondary difference number sequence i at different places in the sequence $DCICS_i$: The sum of the numbers in each of the incomplete cycles of the secondary difference number sequence i.

In addition, the following constants can be stored:

$DCCS_i$: The sum of all the numbers in the secondary difference number sequence i l(i): The length of the secondary difference number sequence i K: The length of the main number sequence.

Figure 6:
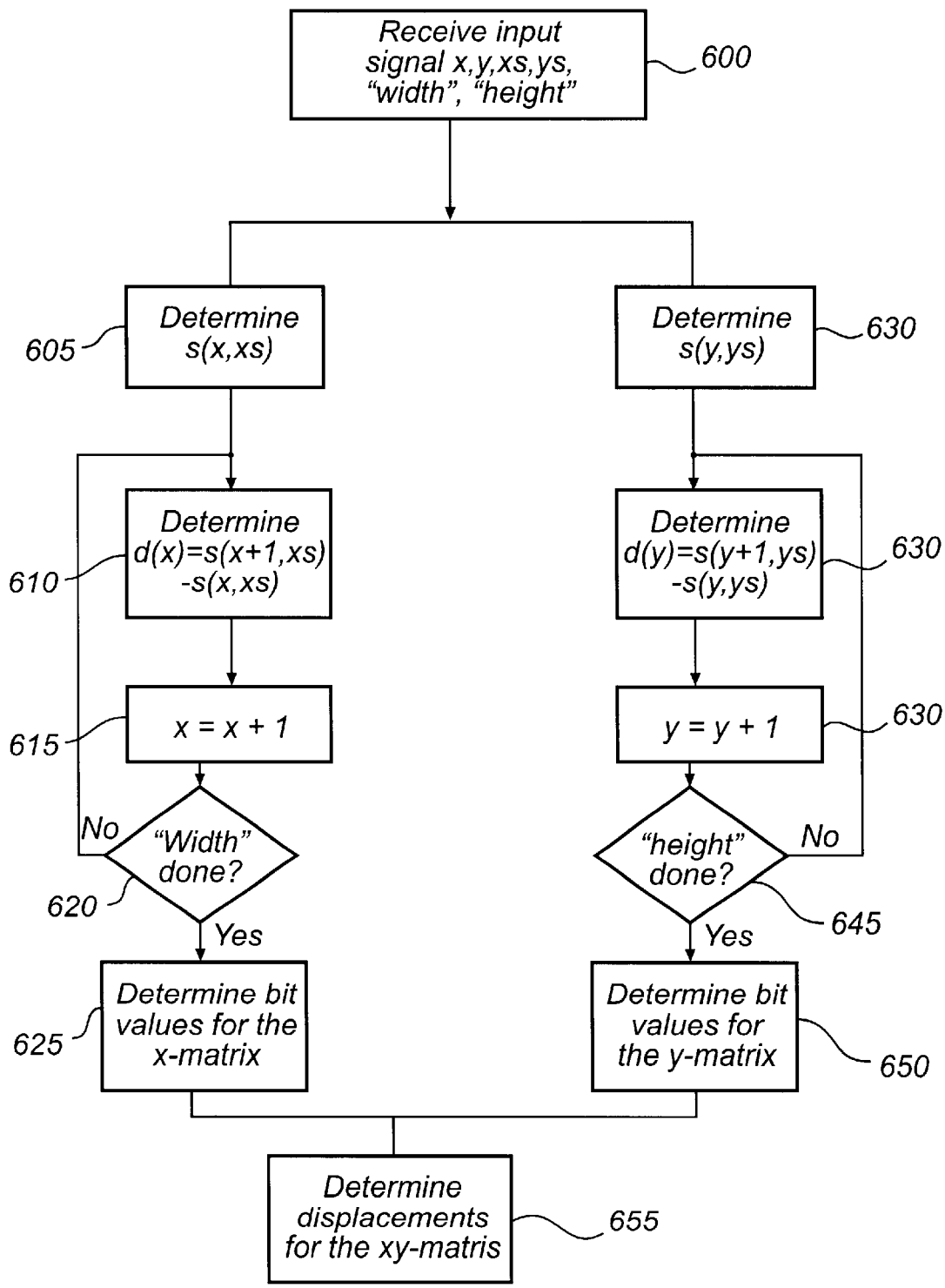
FIG. 6 is a flow chart and shows an example of how the position code can be determined.

A simple flow chart for position coding is shown in FIG. 6. Firstly, in step 600, the input signal is received in the form of x,y,xs,ys,width,height. Thereafter, the x-matrix and the y-matrix can be determined in parallel or sequentially with either x before y or vice versa. This is indicated in the flow chart by the parallel flows. In step 605, the circular shift s(x,sx) is first determined for the first column in the x-position coding. Thereafter, in step 610, the circular shift s(x+1,xs) is determined for the second column. Thereafter, x=x+1 is applied in step 615 and in step 620 it is investigated whether the circular shifts have been determined for the whole width, that is for all the columns. If such is not the case, the flow goes back to step 610 and this step and step 615 are repeated. If such is the case, the bit values in the x-matrix are determined in step 625 by table look-up. In a corresponding way, the bit values for the y-matrix are determined in steps 630–650. Finally, the displacements for the xy-matrix are determined in step 655 by table look-ups.

This is, of course, just a rough schematic example of how the position coding can be carried out and, in practice, it can be varied in many ways. For example, a pair of bits and corresponding displacement for a point can be determined continually as soon as the circular shifts for the point have been determined. As a result, there is no need to buffer the x- and y-matrices.

The method can be implemented in a computer program. The output signal from the computer program does not need to be precisely the xy-matrix with displacement values, but instead it can also constitute some other indication of the partial sequences of the main number sequence that make up the position code.

Practical Example of Position Decoding

The position code can be decoded in a decoding device that can comprise a sensor for reading off the position code and a processor unit of some suitable type. The processor unit comprises the actual processor, working memory and program memory, in which is stored a computer program with instructions for decoding the position code. The processor unit can be incorporated in a typical personal computer, in a hand-held reading device or in some other suitable device. The decoding device can alternatively be realized by special-purpose hardware, such as an ASIC or an FPGA or a similar unit that can be adapted so that it is suitable for this specific task, or by digital and/or analogue circuits or by some suitable combination thereof.

A specific example of a decoding device will be described below.

Figure 7:
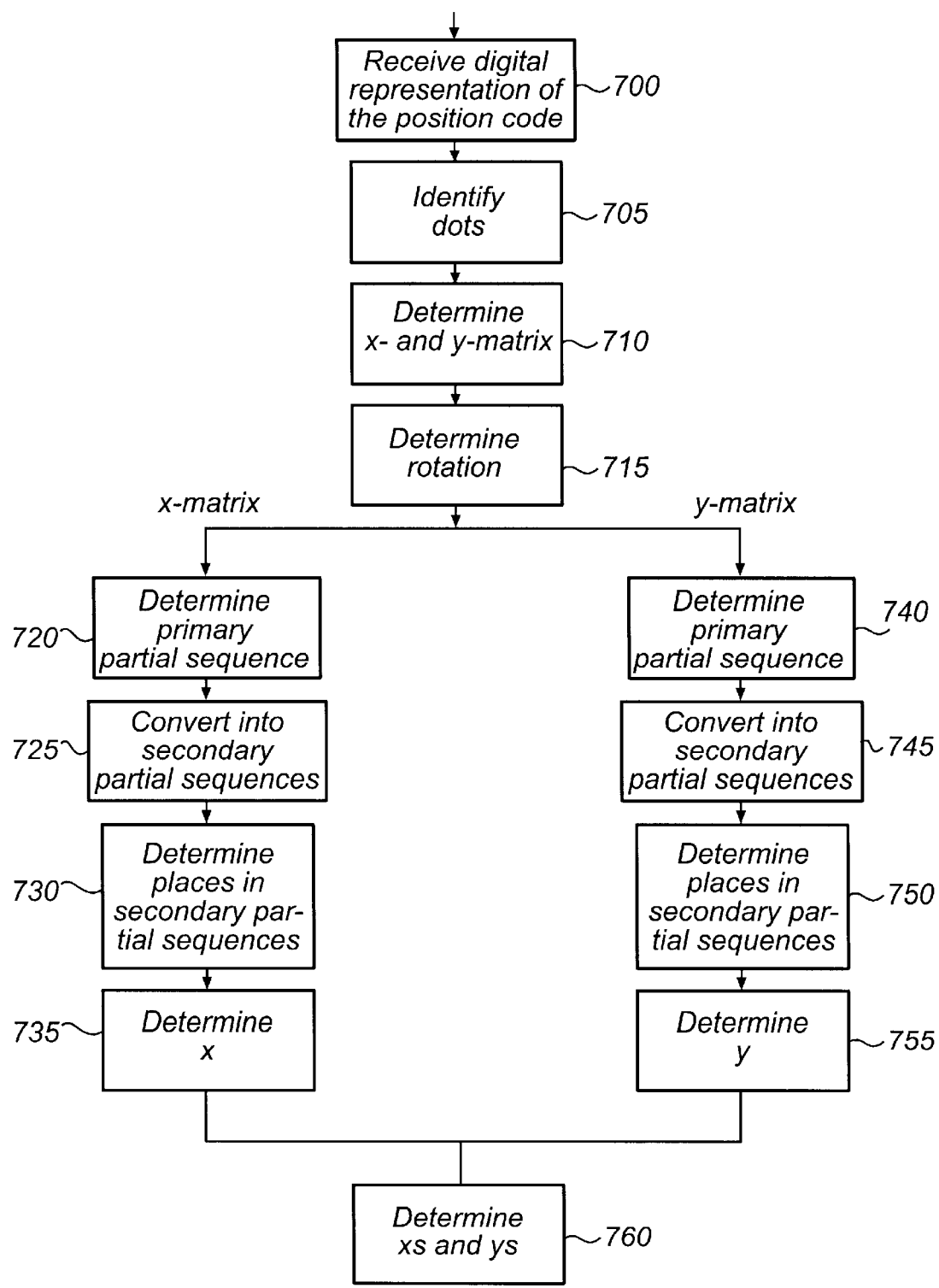
FIG. 7 is a flow chart and shows an example of how the position code can be decoded.

The following description refers to the flow chart in FIG. 7.

The input signal to the decoding device consists of an image or some other digital representation of a detected subset of the position code, which subset codes coordinates for at least one point, step 700. In this example, the position code is represented graphically by dots that are displaced in a predetermined way in relation to raster points in a raster, as has been described above.

In a first step of the decoding, the decoding device identifies the dots in the image, for example by the use of thresholding, and fits a raster to the dots, step 705. The raster can, for example, be determined in the way that is described in Applicant's Patent Application WO 01/26034, by utilization of the distance between different pairs of dots or else in the way described in WO01/75783 by the utilization of Fourier transforms. For each raster point, the displacement of the associated dot is determined and given a value 0–3 depending upon the displacement. A matrix of at least the size $(n_1+1)*(n_1+1)$ is selected, where $n_1$ is the length of the partial sequences of the main number sequence which are used for positioning and the places of which are unambiguously determined in the main number sequence. In the example concerned, an 8*8 matrix is selected $((n_1+2)*(n_1+2))$. This matrix is separated into an x-matrix (also called x-position code) and a y-matrix (also called y-position code) by the displacement values being converted into pairs of bits by being looked up in a table OI that converts displacement values into pairs of bits, step 710. The first bit in each pair of bits forms the x-matrix and the second bit in each pair of bits forms the y-matrix.

In the next step, the four possible types of rotation of the x- and y-matrices (0, 90, 180 and 270 degrees) are investigated and the current rotation is determined, step 715. Use is made of the previously described fact that, in the event of incorrect rotation of the matrix, partial sequences of length 8 occur which are missing in the main number sequence.

At the same time, a certain degree of error correction can be carried out on the basis of the partial sequences of length 8.

When the correct rotation has been determined, in the following steps only the x- and y-matrices are used that are in the middle and turned the right way round and that are $n_1*n_1$ in size, that is in this example two 6*6 matrices. The x-matrix and y-matrix are decoded in parallel or sequentially with x before y or vice versa, which is indicated by the parallel flows in FIG. 7.

In a first step 720 of the decoding of the x-matrix, a partial sequence of the primary difference number sequence is determined, which is called the primary partial sequence in FIG. 7. More specifically, in the x-matrix, the bits in the columns in the matrix constitute partial sequences of the main number sequence. Corresponding places in the main number sequence are determined by being looked up in a table MI that converts partial sequences into places. Thereafter, the difference numbers are determined which are coded by the partial sequences of the main number sequence. In this example, they are five in number. More specifically, the difference numbers are determined as the difference d between the places of adjacent partial sequences, the difference being determined modulo the length of the main number sequence.

The sequence of difference numbers thus obtained is thus a partial sequence of the primary difference number sequence, which is used for the coding in the x-direction, but which on account of its size is not stored in the decoding device. Instead, use is made of the property of the primary difference number sequence, that each partial sequence can be converted into a combination of a partial sequence from each of the secondary difference number sequences. In step 725, the primary partial sequence is thus converted into secondary partial sequences. More specifically, each difference number is rewritten as follows:

$d=d1+b_1*d2+\ldots+b_1*b_2*b_{n-1}*dn$, where n is the number of secondary difference number sequences and $b_i$ is the base in the secondary difference number sequence i. In the example concerned, this becomes:

$d=5+d1+3*d2+9*d3+18*d4$ where d1–d4 can be determined by integer division or by table look-up.

Each of the five numbers in the decoded partial sequence of the primary difference number sequence thus results in four numbers d1,d2,d3,d4. Thus five d1 numbers are obtained that form a partial sequence of the first secondary difference number sequence, five d2 numbers that form a partial sequence of the second secondary difference number sequence, five d3 numbers that form a partial sequence of the third secondary difference number sequence and five d4 numbers that form a partial sequence of the fourth secondary difference number sequence. An example is given below:

| d  | 23 | 45 | 51 | 9 | 37 |
|----|----|----|----|---|----|
| d1 | 2  | 0  | 0  | 0 | 1  |
| d2 | 1  | 0  | 2  | 0 | 0  |
| d3 | 0  | 1  | 1  | 1 | 0  |
| d4 | 1  | 2  | 2  | 0 | 2  |

The respective places of the partial sequences in the secondary difference number sequences are determined, step 730, by being looked up in four tables $DCI_i$, that convert partial number sequences in the respective secondary difference number sequences into places in the respective secondary difference number sequences.

For each partial sequence, a place pi is thus obtained. For these places, it is the case that $$P = p1 \pmod{l1}$$
$$P = p2 \pmod{l2}$$
$$\vdots$$
$$P = pm \pmod{lm}$$

where P is the place in the primary difference number sequence that corresponds to the coordinate X, pi is the place in the secondary difference number sequence i, li is the length of the secondary difference number sequence i and m is the number of secondary difference number sequences.

This system of equations can be solved using the well-known Chinese remainder theorem, as for example described in greater detail in Niven, Suckerman, Introduction to the theory of numbers, Springer Verlag. In step 735, x is thus determined.

Define L=prod (i=1,m)li and qi*(L/li)=1(mod li). The place P in the primary difference number sequence can then be obtained as:
P=(sum(i=1,n)((L/li)*pi*qi))(mod L)
In the example concerned
L=l1*l2*l3*l4=236*233*31*241=410815348
and
q1=135
q2=145
q3=17
q4=62
are obtained.

If, for example, the places p1=97; p2=176; p3=3 and p4=211 are obtained for the partial sequences of the secondary difference number sequences, then the corresponding place P in the primary difference number sequence will be 170326961 according to the Chinese remainder theorem.

When P has been determined, the next step is to determine to which x-section the place belongs. This is carried out first under the assumption that y=0 and by the calculation of s(x,0), that is the place in the main number sequence of the partial number sequence for column x for xs=0. s(x,0) is calculated using the secondary difference number sequences in the same way as has been described above in connection with the determination of the position code for the position x. If s(x,0) is subtracted from the place of the first partial number sequence of the six partial number sequences that are used for the positioning in the x-direction, xs is obtained for y=0.

The y-matrix is decoded prior to, in parallel with or after the decoding of the x-matrix, a place in the primary difference number sequence being determined for the y-direction, in accordance with steps 740–755 in FIG. 7, in a corresponding way to that described above for the x-direction. In addition, the y-section ys concerned is calculated in a corresponding way to that described above for the x-section, but with the assumption that x=0. Finally, in step 760, xs can be determined taking y into account, and ys can be determined taking x into account by subtracting y (modulo the length of the main number sequence) from xs for y=0 and subtracting x (modulo the length of the main number sequence) from ys for x=0.

The following tables can thus be used for the decoding of the position code:
MI: that converts partial sequences of the main number sequence into places in the main number sequence,
$DCI_i$: that converts partial sequences of each of the n secondary difference number sequences into places in the n secondary difference number sequences, and
OI: that converts displacement values into pairs of bits.

It should be emphasized that the flow chart in FIG. 7 is a rough schematic example of how the position decoding can be realized, for example in a computer program.

Example of a Hand-Held Reading Device

The position code can be read off and decoded by various types of reading devices. Such a device can have a sensor for achieving a digital representation of the position code and means for identifying the position code in the digital representation and for decoding this. These means can, as described above, consist of a processor with memory and a suitable program or special-purpose hardware or digital and/or analogue circuits or some suitable combination thereof.

Figure 8:
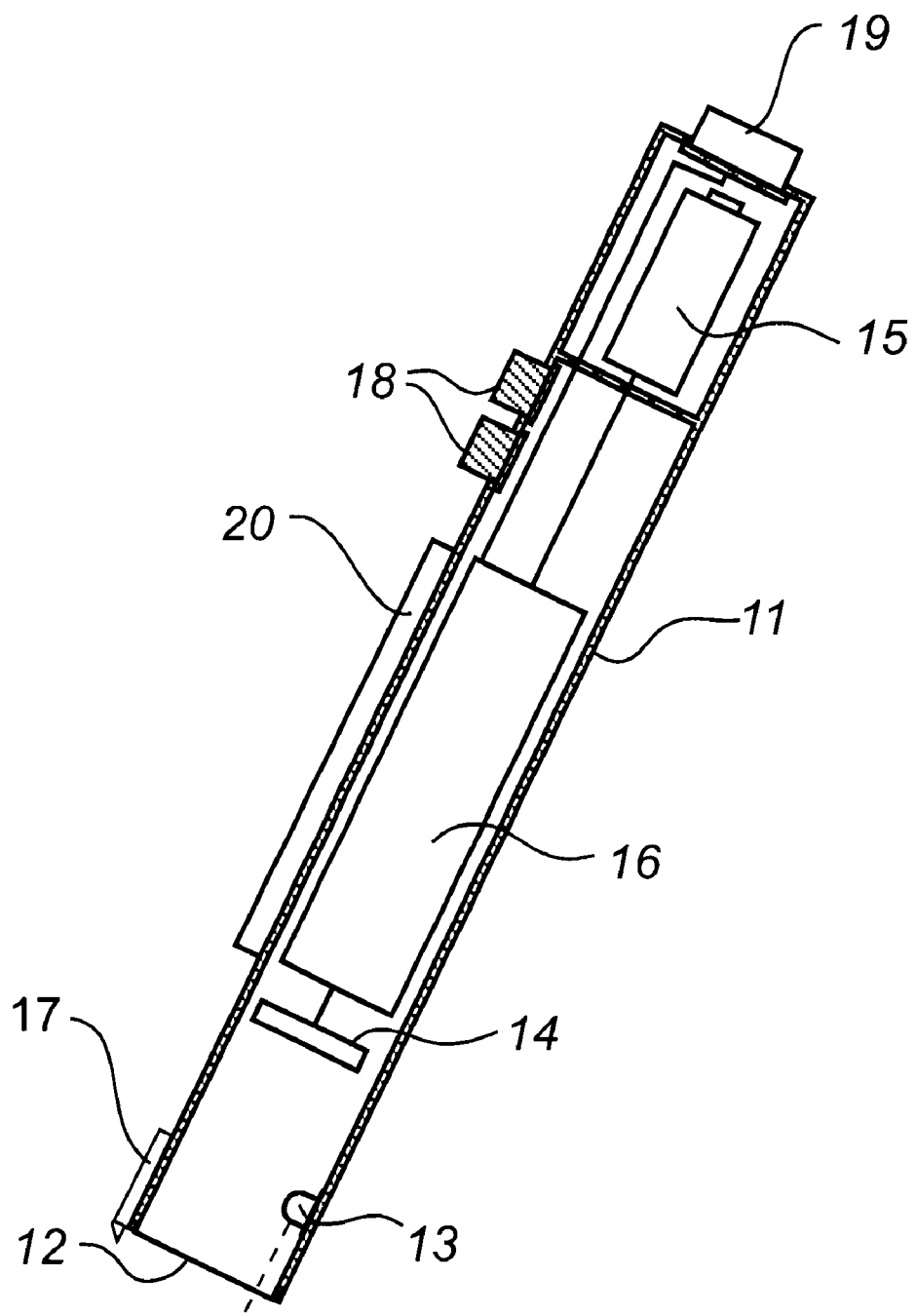
FIG. 8 shows schematically a device that can be used for reading off and decoding of the position code.

An example of a reading device is shown in FIG. 8. It comprises a casing 11 which is approximately the same shape as a pen. In the short side of the casing there is an opening 12. The short side is intended to abut against or to be held a short distance from the surface on which the position determination is to be carried out.

The casing contains essentially an optics part, an electronic circuitry part and a power supply.

The optics part comprises at least one light-emitting diode 13 for illuminating the surface which is to be imaged and a light-sensitive area sensor 14, for example a CCD or CMOS sensor, for recording a two-dimensional image. Optionally, the device can also contain an optical system, such as a mirror and/or lens system. The light-emitting diode can be an infrared light-emitting diode and the sensor can be sensitive to infrared light.

The power supply for the device is obtained from a battery 15, which is mounted in a separate compartment in the casing. It is also possible to obtain the power supply via a cable from an external power source (not shown).

The electronic circuitry part contains a processor unit with a processor that is programmed to record images from the sensor and to carry out position determination on the basis of these images, and also a working memory and a program memory.

In this embodiment, the device also comprises a pen point 17, with the aid of which ordinary pigment-based writing can be written on the surface on which the position determination is to be carried out. The pen point 17 can be extendable and retractable so that the user can control whether or not it is to be used. In certain applications, the device does not need to have a pen point at all.

The pigment-based writing is suitably of a type that is transparent to infrared light and the marks suitably absorb infrared light. By using a light-emitting diode that emits infrared light and a sensor that is sensitive to infrared light, the detection of the pattern can be carried out without the above-mentioned writing interfering with the pattern.

The device can also comprise buttons 18, by means of which the device can be activated and controlled. It has also a transceiver 19 for wireless transmission, for example using infrared light, radio waves or ultrasound, of information to and from the device. The device can also comprise a display 20 for displaying positions or recorded information.

The device can be divided between different physical casings, a first casing containing components that are required for recording images of the position-coding pattern and for transmitting these to components that are contained in a second casing and that carry out the position determination on the basis of the recorded image/images.

Alternative Embodiments

In the embodiment above, a position code is described that codes positions in two dimensions. The position code can, however, also be used to code positions in one dimension. In the example above, for example, a "strip" of the position code can be used along the x-axis with y=0. Alternatively, only an x-coding matrix can be used. In this case each point in the matrix will thus have only one value, for which reason with a binary main number sequence we only need to code graphically a zero and a one.

One use of one-dimensional position coding can be as an equivalent to bar-codes.

In the embodiment above, a binary main number sequence is used. It is, however, possible to use a different base for the main number sequence. This can then result in several different values needing to be coded at each point in the position coding matrix.

In the embodiment above, the same main number sequence and same secondary difference number sequences are used for the coding in the x-direction and the y-direction. This is not necessary. Different sequences can be used for coding in different dimensions. With a view to the need for memory space for storage of tables for the sequences, it can, however, be an advantage to use the same sequences for the coding in all directions.

In the embodiment above, 6*6 dots or symbols are used for the coding of a position. Naturally, fewer or more symbols can be used. There does not need to be the same number of symbols in both dimensions.

In the embodiment above, the partial sequences of the primary difference number sequence are mapped bijectively on the combinations of the partial number sequences and the combinations of the partial number sequences of the secondary difference number sequences are mapped bijectively on the partial sequences of the primary difference number sequence. This is not necessary. Different partial sequences of the primary difference number sequence can be mapped on the same combination of partial sequences of the secondary difference number sequences. There can be partial sequences of the primary difference number sequence that are not mapped on a partial sequence combination. There can also be more partial sequence combinations than primary partial sequences. In the embodiment above, the raster is an orthogonal grid. It can also have other forms, such as a rhombic grid, for example with 60 degree angles, a triangular or hexagonal grid, etc.

Graphical coding with displacement in fewer or more than four directions can be used, for example displacement in three directions along a hexagonal virtual raster. In an orthogonal raster, only two displacements can be used, in order to make easier the re-creation of the raster.

In the embodiment above, difference number in the range of (5,58) are used in order to avoid difference numbers close to zero. Other ranges can however be used, including e.g. difference numbers 3 and 4. In the embodiment above, the pattern is readable optically and the sensor is thus optical. The pattern can, however, be based on a different parameter than an optical parameter. In such a case, the sensor must of course be of a type that can read off the parameter concerned. Examples of such parameters are chemical, acoustic or electromagnetic parameters. Capacitive or inductive parameters can also be used.

The product is exemplified above by a sheet of paper. It can, however, be any product on which the position code can be applied using any of the above parameters. If the position code is optical, it can, for example, be printed out by a printer or printed on a product using normal printing techniques.

Appendix A

The Main Number Sequence M:

0,0,0,0,0,0,1,0,0,1,1,1,1,1,0,1,0,0,1,0,0,0,0,1,1,1,0,1,1,1,0,0,1,0,1,0,1,0,0,0,1,0,1,1,0,1,1,0,0,1,1,0,1,0,1,1,1,1,0,0,0,1,1

Secondary Difference Number Sequences:

A1=0,0,0,0,0,1,0,0,0,0,2,0,1,0,0,1,0,1,0,0,2,0,0,0,1,1,0,0,0,1,2,0,0,1,0,2,0,0,2,0,2,0,1,1,0,1,0,1,1,0,2,0,1,2,0,1,0,1,2,0,2,1,0,0,1,1,1,0,1,1,1,1,0,2,1,0,1,0,2,1,1,0,0,1,2,1,0,1,1,2,0,0,0,2,1,0,2,0,2,1,1,1,0,0,2,1,2,0,1,1,1,2,0,2,0,0,1,1,2,1,0,0,0,2,2,0,1,0,2,2,0,0,1,2,2,0,2,0,2,2,1,0,1,2,1,2,1,0,2,1,2,1,1,0,2,2,1,2,1,2,0,2,2,0,2,2,2,0,1,1,2,2,1,1,0,1,2,2,2,2,1,2,0,0,2,2,1,1,2,1,2,2,1,0,2,2,2,2,2,0,2,1,2,2,2,1,1,1,2,1,1,2,0,1,2,2,1,2,2,0,1,2,1,1,1,1,2,2,2,0,0,2,1,1,2,2

A2=0,0,0,0,1,0,0,0,0,2,0,1,0,0,1,0,1,0,1,1,0,0,0,1,1,1,1,0,0,1,1,0,1,0,0,2,0,0,0,1,2,0,1,0,1,2,1,0,0,0,2,1,1,1,0,1,1,1,0,2,1,0,0,1,2,1,2,1,0,1,0,2,0,1,1,0,2,0,0,1,0,2,1,2,0,0,0,2,2,0,0,1,1,2,0,2,0,0,2,0,2,0,1,2,0,0,2,2,1,1,0,0,2,1,0,1,1,2,1,0,2,0,2,2,1,0,0,2,2,2,1,0,1,2,2,0,0,2,1,2,2,1,1,1,1,1,2,0,0,1,2,2,1,2,0,1,1,1,2,1,1,2,0,1,2,1,1,1,2,2,0,2,2,0,1,1,2,2,2,2,1,2,1,2,2,0,1,2,2,2,0,2,0,2,1,1,2,2,1,0,2,2,0,2,1,0,2,1,1,0,2,2,2,2,0,1,0,2,2,1,2,2,2,1,1,2,1,2,0,2,2,2,

A3=0,0,0,0,0,1,0,0,1,1,0,0,0,1,1,1,1,0,0,1,0,1,0,1,1,0,1,1,1,0,1,

A4=0,0,0,0,0,1,0,2,0,0,0,0,2,0,0,2,0,1,0,0,0,1,1,2,0,0,0,1,2,0,0,2,1,0,0,0,2,1,1,2,0,1,0,1,0,0,1,2,1,0,0,1,0,0,2,2,0,0,0,2,2,1,0,2,0,1,1,0,0,1,1,1,0,1,0,1,1,0,1,2,0,1,1,1,1,0,0,2,0,2,0,1,2,0,2,2,0,1,0,2,1,0,1,2,1,1,0,1,1,1,2,2,0,0,1,0,1,2,2,2,0,0,2,2,2,0,1,2,1,2,0,2,0,0,1,2,2,0,1,1,2,1,0,2,1,1,0,2,0,2,1,2,0,0,1,1,0,2,1,2,1,0,1,0,2,2,0,2,1,0,2,2,1,1,1,2,0,2,1,1,1,0,2,2,2,2,0,2,0,2,2,1,2,1,1,1

,1,2,1;2,1,2,2,2,1,0,0,2,1,2,2,1,0,1,1,2,2,1,1,2,1,2,2,2,
2,1,2,0,1,2,2,1,2,2,0,2,2,2,1,1.

What we claim and desire to secure by Letters Patent is:

1. A method for position coding, comprising coding positions in a first dimension on a surface in accordance with a primary number sequence, that has the property that the place in the primary number sequence of each partial sequence of a first predetermined length is unambiguously determined, each position in the first dimension being coded by one of the partial sequences, the primary number sequence being built up of at least two secondary number sequences that have smaller bases than the base of the primary number sequence and that are used for determination of the partial sequences of the primary number sequence corresponding to the positions in the first dimension.

2. A method according to claim 1, in which the numbers in the primary number sequence are coded using partial sequences of a second predetermined length of a cyclic main number sequence, that has the property that the place in the cyclic main number sequence of each partial sequence of the second predetermined length is unambiguously determined, the partial sequences of the cyclic main number sequence being arranged on the surface in such a way that difference numbers are defined that form the numbers in the primary number sequence.

3. A method according to claim 2, in which the partial sequences of the cyclic main number sequence are arranged on the surface in such a way that each partial sequence extends in a second dimension.

4. A method according to claim 2, in which only a subset of the difference numbers that theoretically are definable using the partial sequences of the main number sequence are utilized, which subset excludes such theoretically definable difference numbers that are equal to or near zero.

5. A method according to claim 2, in which the main number sequence is binary and is selected in such a way that no partial sequence of a predetermined length which is longer than the second predetermined length occurs in a backwards or inverted form in the main number sequence.

6. A method according to claim 2, in which the main number sequence is binary and is selected in such a way that no partial sequence of a predetermined length which is longer than the second predetermined length occurs with one bit inverted in the main number sequence.

7. A method according to claim 2, in which the partial sequence of the main number sequence, which partial sequence is of the second predetermined length, consists of six numbers, and the partial sequence of the primary number sequence, which partial sequence is of the first predetermined length, consists of five difference numbers.

8. A method according to claim 2, in which the cyclic main number sequence M is as follows:

M=0,0,0,0,0,1,0,0,1,1,1,1,1,0,1,0,0,1,0,0,0,0,1,1,1,0,1, 1,1,0,0,1,0,1,0,1,0,0,0,1,0,1,1,0,1,1,0,0,1,1,0,1,0,1,1, 1,1,0,0,0,1,1.

9. A method according to claim 1, further comprising coding positions in a second dimension on the surface in accordance with a second primary number sequence that has the property that the place in the second primary number sequence of each partial sequence of a third predetermined length is unambiguously determined, each position in the second dimension being coded by one of the partial sequences in the second primary partial sequence and the second primary number sequence being built up of at least two second secondary number sequences that have smaller bases than the base of the second primary number sequence and that are used for determination of the partial sequences of the second primary number sequence corresponding to the positions in the second dimension.

10. A method according to claim 9, in which the primary and the secondary number sequences for the position coding in the first and the second dimension are the same.

11. A method according to claim 1, further comprising letting the number of different numbers in the primary number sequence that are usable for the position coding be such that the number can be factored into at least two factors, using the same number of secondary number sequences as the number of factors, and letting each of the factors form the base in a respective secondary number sequence.

12. A method according to claim 1, further comprising letting the lengths of the secondary number sequences be relatively prime in pairs.

13. A method according to claim 1, in which each of the secondary number sequences has the property that each partial sequence that has the first predetermined length, has an unambiguously determined place in the respective secondary number sequence.

14. A method according to claim 1, in which the base of the secondary number sequences is at most 5, preferably at most 3.

15. A method according to claim 1, in which the partial sequences of the primary number sequence can be mapped bijectively on combinations of a partial sequence from each of the secondary number sequences.

16. A method according to claim 1, in which the primary number sequence contains fifty-four different numbers and the secondary number sequences are four in number, three of which have the base three and one of which has the base two.

17. A method according to claim 1, in which the secondary number sequences are as follows:

A1=0,0,0,0,0,1,0,0,0,0,2,0,1,0,0,1,0,1,0,0,2,0,0,0,1,1,0, 0,0,1,2,0,0,1,0,2,0,0,2,0,2,0,1,1,0,1,0,1,1,0,2,0,1,2,0,1, 0,1,2,0,2,1,0,0,1,1,1,0,1,1,1,1,0,2,1,0,1,0,2,1,1,0,0,1,2 ,1,0,1,1,2,0,0,0,2,1,0,2,0,2,1,1,1,0,0,2,1,2,0,1,1,1,2,0, 2,0,0,1,1,2,1,0,0,0,2,2,0,1,0,2,2,0,0,1,2,2,0,2,0,2,2,1,0 ,1,2,1,2,1,0,2,1,2,1,1,0,2,2,1,2,1,2,0,2,2,0,2,2,2,0,1,1, 2,2,1,1,0,1,2,2,2,2,1,2,0,0,2,2,1,1,2,1,2,2,1,0,2,2,2,2,2 ,0,2,1,2,2,2,1,1,1,2,1,1,2,0,1,2,2,1,2,2,0,1,2,1,1,1,1,2, 2,2,0,0,2,1,1,2,2

A2=0,0,0,0,0,1,0,0,0,0,2,0,1,0,0,1,0,1,0,1,1,0,0,0,1,1,1, 1,0,0,1,1,0,1,0,0,2,0,0,0,1,2,0,1,0,1,2,1,0,0,0,2,1,1,1,0 ,1,1,1,0,2,1,0,0,1,2,1,2,1,0,1,0,2,0,1,1,0,2,0,0,1,0,2,1, 2,0,0,0,2,2,0,0,1,1,2,0,2,0,0,0,2,0,2,0,1,2,0,0,2,2,1,1,0,0 ,2,1,0,1,1,2,1,0,2,0,2,2,1,0,0,2,2,2,1,0,1,2,2,0,0,2,1,2, 2,1,1,1,1,1,2,0,0,1,2,2,1,2,0,1,1,2,1,1,2,0,1,2,1,1,1,2 ,2,0,2,2,0,1,1,2,2,2,1,2,12,2,2,0,1,2,2,2,0,2,0,2,1,1,2, 2,1,0,2,2,0,2,1,0,2,1,1,0,2,2,2,2,0,1,0,2,2,1,2,2,2,1,1,2 ,1,2,0,2,2,2,

A3=0,0,0,0,0,1,0,0,1,1,0,0,0,1,1,1,1,0,0,1,0,1,0,1,1,0,1, 1,1,0,1,

A4=0,0,0,0,0,1,0,2,0,0,0,0,2,0,0,2,0,1,0,0,0,1,1,2,0,0,0, 1,2,0,0,2,1,0,0,0,2,1,1,2,0,1,0,1,0,0,1,2,1,0,0,1,0,0,2,2, 0,0,0,2,2,1,0,2,0,1,1,0,0,1,1,1,0,1,0,1,1,0,1,2,0,1,1,1, 1,0,0,2,0,2,0,1,2,0,2,2,0,1,0,2,1,0,1,2,1,1,0,1,1,1,2,2,0 ,0,1,0,1,2,2,2,0,0,2,2,2,0,1,2,1,2,0,2,0,0,1,2,2,0,1,1,2, 1,0,2,1,1,0,2,0,2,1,2,0,0,1,1,0,2,1,2,1,0,1,0,2,2,0,2,1,0 ,2,2,1,1,1,1,2,0,2,1,1,1,0,2,2,2,2,0,2,0,2,2,1,2,1,1,1,1,2, 1,2,1,2,2,2,1,0,0,2,1,2,2,1,0,1,1,2,2,1,1,2,1,2,2,2,2,1,2, 0,1,2,2,1,2,2,0,2,2,2,1,1.

18. A method according to claim 1, further comprising printing out the position code with graphical coding on the surface.

19. A computer program comprising instructions for causing a computer to carry out position coding, which computer program comprises instructions for coding positions in a first dimension on a surface in accordance with a primary number sequence that has the property that the place in the primary number sequence of each partial sequence of a first predetermined length is unambiguously determined, each position in the first dimension being coded by one of the partial sequences;

the primary number sequence being built up of at least two secondary number sequences that have a smaller base than the base of the primary number sequence and that are used by the computer program for determination of the partial sequences of the primary number sequence which correspond to the positions in the first dimension.

20. A device for coding positions, which device comprises a processor and a memory which stores a computer program according to claim 19.

21. A method in a coding device for determining a position code that codes at least a first coordinate x for a first point and for a first dimension on a surface, comprising receiving at least the first coordinate x as the input signal to the coding device, determining, on the basis of the received coordinate x, a partial sequence of a primary number sequence, which is used for coding of positions in the first dimension, which partial sequence has a first predetermined length and has an unambiguously determined place in the primary number sequence, corresponding to the received coordinate x, the primary number sequence being built up of at least two secondary number sequences that have smaller bases than the primary number sequence and that are used by the coding device for determination of the partial sequence of the primary number sequence corresponding to the coordinate x.

22. A method according to claim 21, further comprising coding the numbers in the partial sequence of the primary number sequence using partial sequences of a second predetermined length of a cyclic main number sequence, that has the property that the place in the cyclic main number sequence of each partial sequence of the second predetermined length is unambiguously determined, the numbers in the partial sequence of the primary number sequence being coded as differences of the partial sequences of the cyclic main number sequence.

23. A method according to claim 22, further comprising calculating a first partial sequence among the partial sequences of the cyclic main number sequence by summing the x−1 first numbers in each of the secondary number sequences repeated cyclically.

24. A method according to claim 23, further comprising determining a second partial sequence among the partial sequences of the main number sequence by determining the number d(x) in the partial sequence of the primary number sequence that is coded by the first and the second partial sequences of the main number sequence.

25. A method according to claim 24, in which the number d(x) that is coded by the first and the second partial sequences of the main number sequence is calculated as $d(x)=dc(1,x)+b_1*dc(2,x)+\cdots+b_1* *b_{n-1}*dc(n,x)$ where n is the number of secondary number sequences, $b_i$ is the base in the secondary number sequence i and dc(i,x) is the number at place x modulo $l_i$ in the respective secondary number sequence of length $l_i$.

26. A method according to claim 23, in which the numbers in the secondary number sequences are summed by the use of previously calculated sums of complete and incomplete cycles of the secondary number sequences.

27. A method according to claim 23, in which the coding device is arranged to further receive as input signal the place in the cyclic main number sequence of the partial sequence for the coordinate x=0 and which further comprises the step of using the place of the coordinate x=0 for the calculation of the first partial sequence among the partial sequences of the main number sequence.

28. A method according to claim 22, further comprising outputting a position code that comprises an indication of the partial sequences of the cyclic main number sequence as output signal from the coding device.

29. A method according to claim 22, further comprising causing a device to apply the partial sequences of the main number sequence on the surface in such a way that these extend in a second dimension and in such a way that the numbers in the partial sequence of the primary number sequence extend in the first dimension.

30. A method according to claim 21, in which determining a partial sequence of the primary number sequence comprises converting the place in the primary number sequence into a place in each of the secondary number sequences.

31. A method according to claim 30, in which determining a partial sequence of the primary number sequence further comprises determining for each of the secondary number sequences the partial sequence that corresponds to the determined place in the secondary number sequence and of determining the partial sequence of the primary number sequence on the basis of the thus determined partial sequences of the secondary number sequences.

32. A method according to claim 21, further comprising receiving a second coordinate y for the first point and for a second dimension on the surface as input signal to the coding device, determining, on the basis of the received coordinate y, a partial sequence of a second primary number sequence which is used for coding positions in the second dimension, which partial sequence has a third predetermined length and has an unambiguously determined place, corresponding to the received coordinate y, in the second primary number sequence, the second primary number sequence being built up of at least two second secondary number sequences, that have smaller bases than the second primary number sequence and that are used by the coding device for determination of the partial sequence of the second primary number sequence corresponding to the coordinate y.

33. A computer program comprising instructions for causing a computer to carry out a method according to any one of claims 21–32.

34. A device for coding positions, which device comprises a processor and a memory which stores a computer program according to claim 33.

35. A method for decoding of a position code that codes at least a first coordinate (x;y) for a first point and a first dimension on a surface, which method comprises identifying a first predetermined number of numbers that form a partial sequence of a primary number sequence on the basis of a digital representation of the position code, which partial sequence has an unambiguously determined place P in the primary number sequence, which place corresponds to the first coordinate; and determining the place P of the partial sequence in the primary number sequence comprises using at least two secondary number sequences, which build up the primary number sequence and each of which has a base that is smaller than the base of the primary number sequence.

36. A method according to claim 35, in which determining the place P of the partial sequence in the primary number sequence comprises converting the partial sequence of the primary number sequence into a combination of a partial sequence of each of the secondary number sequences.

37. A method according to claim 36, in which converting the partial sequence of the primary number sequence into a partial sequence of each of the secondary number sequences comprises converting each number d in the partial sequence of the primary number sequence into a set of numbers $d_1, \ldots d_n$, in accordance with the following: $d=d_1+b_i{}^*d_2+ \ldots b_1{}^*b_2 \ldots {}^*b_{n-1}{}^*d_n$, where n is the number of secondary number sequences and $b_i$ is the base in the secondary number sequence i.

38. A method according to claim 36, in which the place P in the primary number sequence is determined using the Chinese remainder theorem as P=(sum(i=1,n) ((L/l_i)*pi*qi)) (mod L)

where L=prod(i=1,n)li, pi is the place in the secondary number sequence i, $l_i$ is the length of the secondary number sequence i and m is the number of secondary number sequences and $q_i{}^*(L/l_i)=1$ (mod $l_i$).

39. A method according to claim 35, further comprising determining the place in the respective secondary number sequence of each of the partial sequences in the combination and determining the place P in the primary difference number sequence on the basis of the combination of the places in the secondary number sequences.

40. A method according to claim 35, further comprising determining an additional coordinate (xs; ys) for the first point and the first dimension by determining the place in the main number sequence of the partial sequence for the coordinate 0.

41. A method according to claim 35, in which the position code further codes a second coordinate (y;x) for the first position and for a second dimension and which further comprises the step of identifying a third predetermined number of numbers that form a partial sequence of a second primary number sequence, on the basis of the digital representation of the position code, which partial sequence has an unambiguously determined place in the second primary number sequence, which place corresponds to the second coordinate; and of determining the place of the partial sequence in the second primary number sequence using at least two second secondary number sequences, each of which has a base that is smaller than the base of the second primary number sequence.

42. A method according to claim 35, in which the method is carried out in a decoding device that receives the digital representation of the position code as input signal and gives at least the first coordinate for the first point as output signal.

43. A computer program that comprises instructions for causing a computer to carry out a method according to any one of claims 35–42.

44. A device for decoding a position code, which device comprises a processor and a memory that stores a computer program for decoding of a position code according to claim 43.

45. A device for decoding of a position code, that codes at least a first coordinate for a first point and a first dimension on a surface, which device comprises a sensor for providing a digital representation of the position code that is to be decoded, memory for storing at least two secondary number sequences that build up a primary number sequence with a larger base than the bases of the secondary number sequences, and a processor that is arranged to identify a first predetermined number of numbers that form a partial sequence of the primary number sequence, on the basis of the digital representation of the position code, which partial sequence has an unambiguously determined place P in the primary number sequence, which place corresponds to the first coordinate and to determine the place P in the primary number sequence by means of the secondary number sequences.

46. A device according to claim 45, wherein the processor is further arranged to convert the partial sequence of the primary number sequence into a combination of a partial sequence of each of the secondary number sequences in order to determine the place P of the partial sequence in the primary number sequence.

47. A device according to claim 46, wherein the processor is further arranged to determine the place in the respective secondary number sequence of each of the partial sequences in the combination and determine the place P in the primary difference number sequence on the basis of the combination of the places in the secondary number sequences.

48. A product that is provided with a position code that codes at least a first coordinate for a first point and for a first dimension, the first coordinate for the first point being coded by a partial sequence of a primary number sequence, which partial sequence has a first predetermined length, which primary number sequence has the property that the place in the primary number sequence of each partial sequence of the predetermined length is unambiguously determined and which primary number sequence is in addition built up of at least two secondary number sequences that have a smaller base than the base of the primary number sequence.

* * * * *